United States Patent [19]
Koning

[11] Patent Number: 5,899,402
[45] Date of Patent: May 4, 1999

[54] TORSION BAR WITH SHARP, RAPID ONSET PROPERTY AND RETRACTOR

[75] Inventor: Richard W. Koning, Yale, Mich.

[73] Assignee: Breed Automotive Technology, Inc., Lakeland, Fla.

[21] Appl. No.: 09/060,241

[22] Filed: Apr. 14, 1998

[51] Int. Cl.[6] .......................... B60R 22/28; B60R 22/34; B65H 75/48
[52] U.S. Cl. .......................................................... 242/379.1
[58] Field of Search ................. 242/379.1; 280/805, 280/806, 807; 72/377; 29/897, 897.2, 897.35, 557, 558

[56] References Cited

U.S. PATENT DOCUMENTS

| | | | |
|---|---|---|---|
| 3,741,494 | 6/1973 | Fiala | 242/379.1 |
| 3,857,528 | 12/1974 | Fiala | 242/379.1 |
| 3,881,667 | 5/1975 | Tandetzke | 242/379.1 |
| 3,961,761 | 6/1976 | Wiesbock | 242/379.1 |
| 4,322,046 | 3/1982 | Tanaka et al. | 242/379.1 |
| 5,320,385 | 6/1994 | Schmid et al. | 280/805 |
| 5,344,095 | 9/1994 | Frei | 242/374 |
| 5,526,996 | 6/1996 | Ebner et al. | 242/379.1 |
| 5,529,258 | 6/1996 | Dybro et al. | 242/374 |
| 5,624,083 | 4/1997 | Modinger et al. | 242/374 |
| 5,628,469 | 5/1997 | Fohl | 242/379.1 |
| 5,722,611 | 3/1998 | Schmid et al. | 242/379.1 |
| 5,738,293 | 4/1998 | Fohl | 242/379.1 |
| 5,749,601 | 5/1998 | Knoll et al. | 280/805 |

*Primary Examiner*—John P. Darling
*Attorney, Agent, or Firm*—Markell Seitzman

[57] ABSTRACT

A torsion bar (50) and seat belt retractor (20). The torsion bar (50) has a circular cross section where the torsion bar is formed as a cold headed extruded part and wherein the grain structure of the metal is aligned along the axis (axial direction) of the bar generally in the center of the bar and the grain structure smoothly diverges from the axial direction near an end formation (52a,b). The seat belt retractor (20) includes: a frame (22) to rotationally support the torsion bar and spool (30). The torsion bar (30) is characterized by an elastic deformation zone and a sharp onset into a plastic deformation zone. The spool is operatively connected to rotate with the torsion bar. The retractor also includes a locking device, activated during a vehicle accident and operatively linked to the torsion bar for preventing one side of the torsion bar from rotating while permitting the other side and the spool to rotate once loaded by the occupant.

8 Claims, 3 Drawing Sheets

TORSION BAR WITH SHARP, RAPID ONSET PROPERTY AND RETRACTOR

BACKGROUND AND SUMMARY OF THE INVENTION

The present invention generally relates to torsion bars usable in energy absorbing seat belt retractors.

The classic type of seat belt retractor comprises a frame with a spool rotationally mounted upon the frame. The spool will typically include one or more lock wheels each having a plurality of teeth which are engaged and locked by a corresponding lock pawl. The lock pawl or lock dog is rotationally mounted to the frame and movable from a disengaged position to an engaged position with a tooth of the lock wheel. In this type of retractor once the spool is locked, further rotation of the spool is prohibited. One skilled in the art will appreciate that all forward motion of the occupant will not be stopped in this type of retractor because as the occupant loads the locked retractor, the seat belt is stressed and stretches and the seat belt slips over itself (the so called film spool effect).

However, with an energy absorbing retractor, the spool and its associated mechanisms are permitted to rotate and the seat belt is controllably permitted to protract in response to the load imparted to the seat belt by the occupant. The forward motion of the occupant is restricted by a reaction force or torque generated within the retractor. In this way the protraction of the seat belt and the forward motion of the occupant are controlled. Energy absorbing seat belt retractors often employ a deformable member such as a crushable bushing or a torsion bar. In either case, the bushing is crushed or the torsion bar twisted beyond its elastic limit into its plastic range or zone of operation to generate the desired (theoretically constant) reaction torque which acts against the torque transferred to the retractor spool via the forces imparted to the seat belt by the moving occupant.

The goal of an energy absorbing retractor is to generate a generally constant reaction force to oppose the forward motion of the occupant and to be able to generate this constant force during the accident event, that is, during entire time that the seat belt is loaded by the occupant. In theory this can be achieved by utilizing a crush bushing or torsion bar that always operates in its constant plastic zone.

In a torsion bar, seat belt retractor, one end of the torsion bar is fixedly attached to a lock wheel and the other end is fixed to the retractor spool. During an accident the lock wheel is prevented from rotating by interposing a lock dog or lock pawl within the teeth of the lock wheel. As the seat belt is loaded by the occupant, the spool will tend to rotate in opposition to the reaction torque generated within the torsion bar, as the torsion bar is twisted. The generated reaction torque depends upon the amount that the torsion bar is rotated or twisted as well as upon the physical characteristics of the torsion bar.

More specifically, the reaction torque generated by a torsion bar will vary depending upon whether the torsion bar is in its elastic, transition or plastic zones or ranges. As mentioned, in an ideal torsion bar, the elastic range is characterized by a steep (preferably infinitely steep slope or deflection curve) and the plastic range is characterized by a perfectly constant torque deflection region having a sharp transition from the elastic region. In this ideal torsion bar and corresponding seat belt retractor, once a first end of the torsion bar is locked and the spool loaded, the torsion bar will immediately make a transition from its elastic range (see curve 100 of FIG. 1) into the plastic range of operation such that a constant reaction force is generated by the retractor as the seat belt is protracted.

Prior art torsion bars have been made using a number of different manufacturing methods. In one method, an oversized metal bar is machined to reduce its diameter to a desired dimension. Subsequently, end formations are formed on the machined bar such as by cold rolling. The machining of the bar may produce stress risers which are typically non-uniform and the cold rolling of the machined bar, it is believed, reorients the grain structure of the metal in an undesirable manner. To make the stress distribution within the torsion bar more uniform, an annealing step (heating within an oxygen-controlled atmosphere) is often used, which adds to the cost of the final product. However, this type of torsion bar does not achieve the objects of the present invention as it displays the characteristic torque deflection curve similar to that shown in curve 102 of FIG. 1 having an elastic zone, an extended elastic/plastic transition zone and a plastic zone. In another method of manufacture the torsion bar is made using a cold-formed process in which a metal bar or wire (large diameter), has a diameter less than the desired dimension. The smaller than desired diameter bar is expanded into a bar having the desired larger diameter. This type of bar has been tested and it displays or shows a characteristic torque deflection curve similar to that of curve 102 of FIG. 1. The prior art has also suggested a method of making a torsion bar having a shortened or abrupt elastic/plastic transition zone. In this method a pre-machined or pre-formed torsion bar is work hardened (by being pre-torqued or twisted beyond its yield torque level) prior to installation within a seat belt retractor. One potential deficiency of this technique is that the pre-twisting reduces the useful range through which the torsion bar can be additionally twisted, during an accident, once installed within a retractor.

It is an object of the present invention to provide a torsion bar which displays an abrupt transition from its elastic zone to its plastic zone. A further object of the invention is to provide an energy absorbing seat belt retractor which uses the above type of torsion bar.

Accordingly, the invention comprises: a torsion bar having a circular cross section where the torsion bar is formed as a cold headed extruded part. Preferably, the grain structure of the metal is aligned along the axis (axial direction) of the bar. If the grain structure diverges from the axial direction near an end formation it does so smoothly.

Additionally, the invention comprises a seat belt retractor having: a frame; wherein the torsion bar is rotationally supported relative to the frame and wherein the torsion bar is capable of generating a determinable reaction torque as it is twisted (with one end thereof fixed). The torsion bar is characterized by an elastic deformation zone and a sharp onset into a plastic deformation zone. The retractor also includes a spool operatively connected to rotate with the torsion bar; lock means, adaptable during a vehicle accident and operatively linked to the torsion bar for preventing one side of the torsion bar from rotating while permitting the other side and the spool to rotate once loaded by the occupant.

Many other objects and purposes of the invention will be clear from the following detailed description of the drawings.

DETAILED DESCRIPTION OF THE DRAWINGS

Figure 3A:
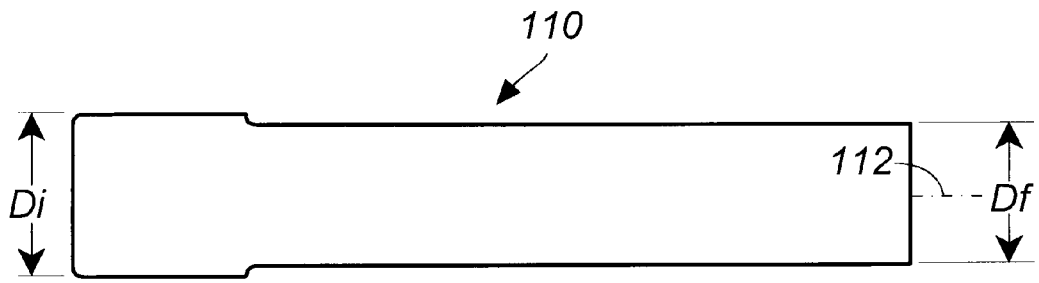
FIGS. 3a and 3b show a torsion bar in various steps of completion.
Figure 3B:
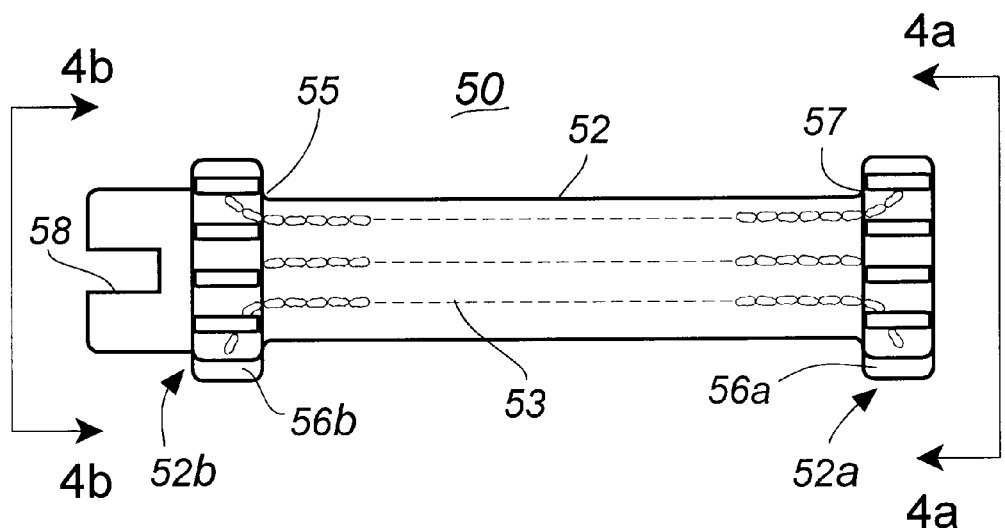

Reference is now made to FIGS. 3a and 3b which show a torsion bar made in accordance with the present invention. The torsion bar 50 includes a center body 52 and two end formations 52a and 52b which enable the torsion bar to be respectively mated with a spring arbor and a ratchet body. The torsion bar 50 is made from a bar (or large diameter wire) of metal having a circular diameter. In the preferred embodiment the bar or wire is made from 1005, aluminum killed, spheridized annealed steel with a Rockwell B rating of between 50 and 70 and preferably in the range of 60–65. This metal is chosen because it is sufficiently ductile with its grain structure generally longitudinally aligned.

The initial diameter $D_i$ (see FIG. 3a) of the metal bar 110 is approximately five percent (5%) greater than the desired or final diameter $D_d$ of the torsion bar 50. The final diameter of the torsion bar is achieved using a cold forming extrusion process in which the bar 110 (see FIG. 3a) is partially forced through a die (not shown) and then bar 110 is cut to the desired length. During this extrusion process or step, the grain structure of the metal bar 110 remains oriented in a generally longitudinal direction. Numeral 53 diagrammatically illustrates a typical pattern of a longitudinal grain structure. That is, the grain structure lies parallel to the axis 112 of the torsion bar 50. Even if the grain structure of the original bar or wire stock does not have its grain structure longitudinally aligned this extrusion process will so align the grain structure.

Figure 1:
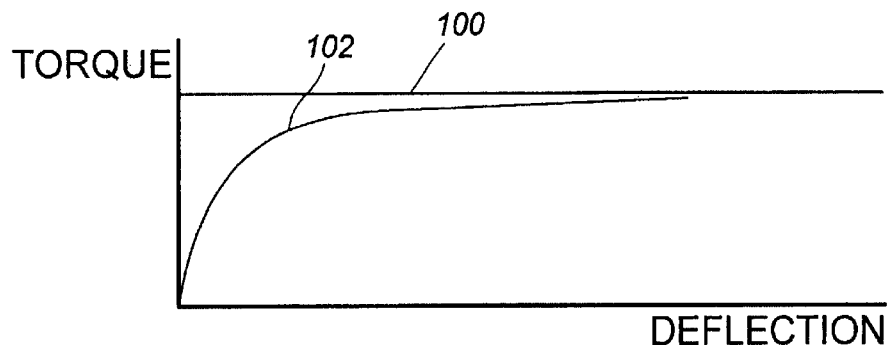
FIG. 1 shows a torque-deflection curve for an idealized torsion bar and for a conventional torsion bar having a circular cross section.
Figure 5:
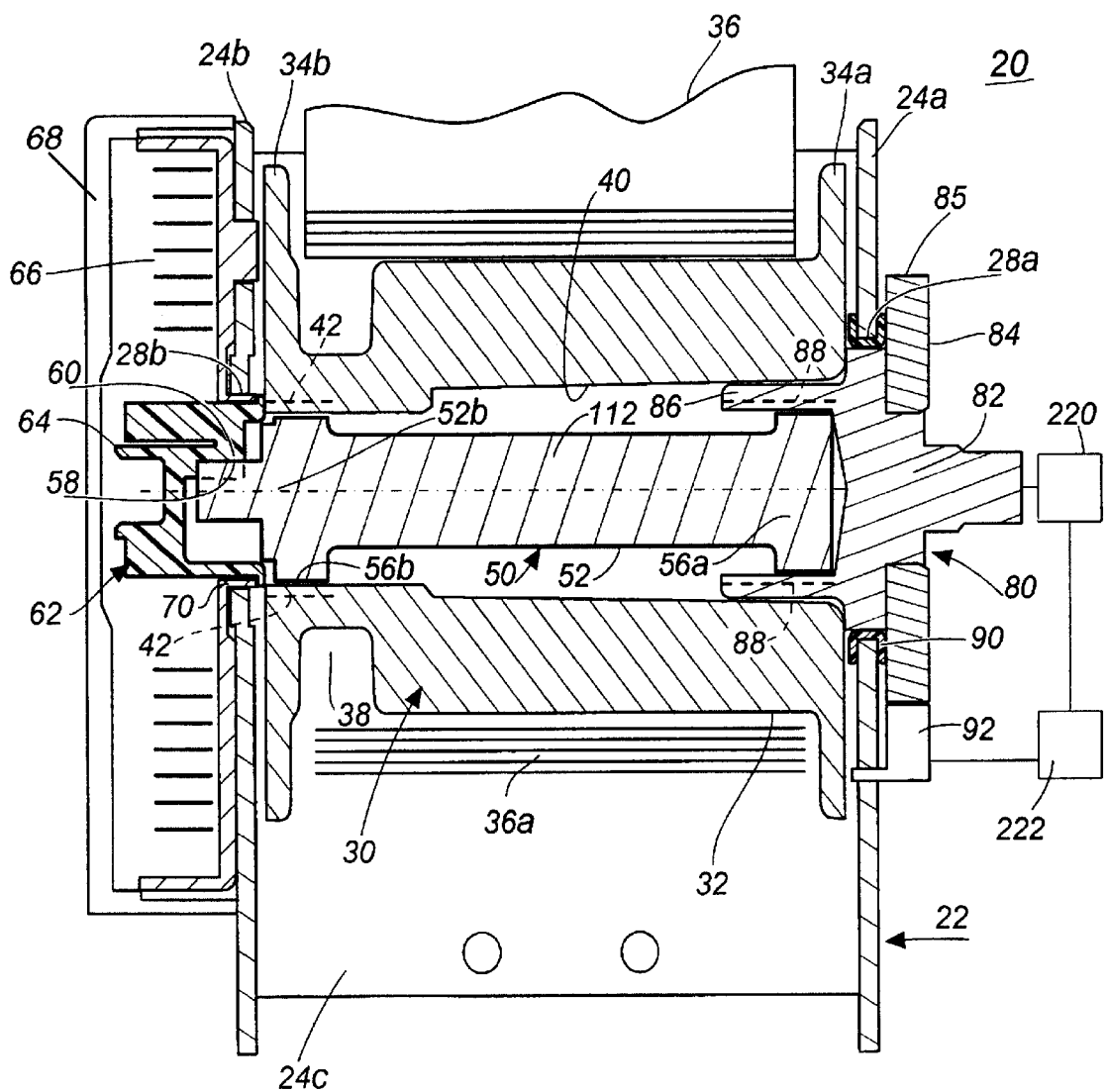
FIG. 5 shows a seat belt retractor incorporating a torsion bar of the present invention.
Figure 4A:
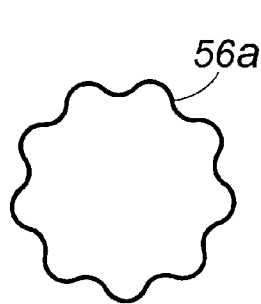
FIGS. 4a and 4b are end plan views of the torsion bar.
Figure 4B:
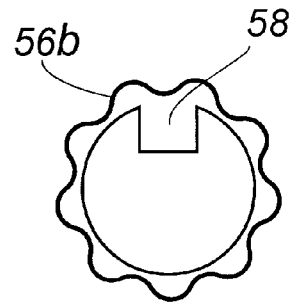

Subsequent to reducing the diameter of the bar 110 to the desired dimension, the ends of the bar 110 are cold headed to form the end formations 52a and 52b. These formations can be formed in a multi-step process or in a single step. FIGS. 4a and 4b show end views of each of the end formations. The end formation 52a includes an enlarged diameter section upon which is formed a plurality of splines 56a. The end formation 52b includes an enlarged section having splines 56b and at least one integrally formed notch or groove 58 which provides a means to receive a driving key 60 as shown in FIG. 5. The cold headed process used to form the enlarged diameter splined sections 56a and 56b will maintain the longitudinal grain structure in the bar as well as add a radial component to the grain structure of the material. However, it is believed the transition radii 55 and 57 (see FIG. 3b) prevent any discontinuities in the grain structure and stress distribution. Consequently, it is possible to eliminate the process step of annealing commonly used after metal forming. Surprisingly, if the torsion bar 50 is annealed, the resulting torque deflection curve is as shown by curve 202 of FIG. 2b.

Figure 2A:
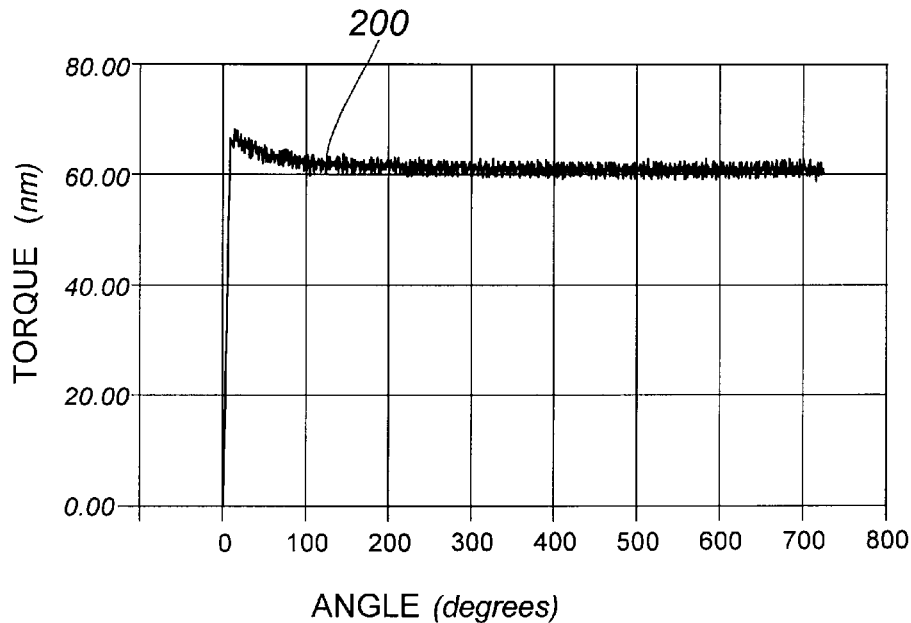
FIG. 2a shows test data illustrating a torque-deflection curve for a torsion bar that has been cold-formed in accordance with the present invention.
Figure 2B:
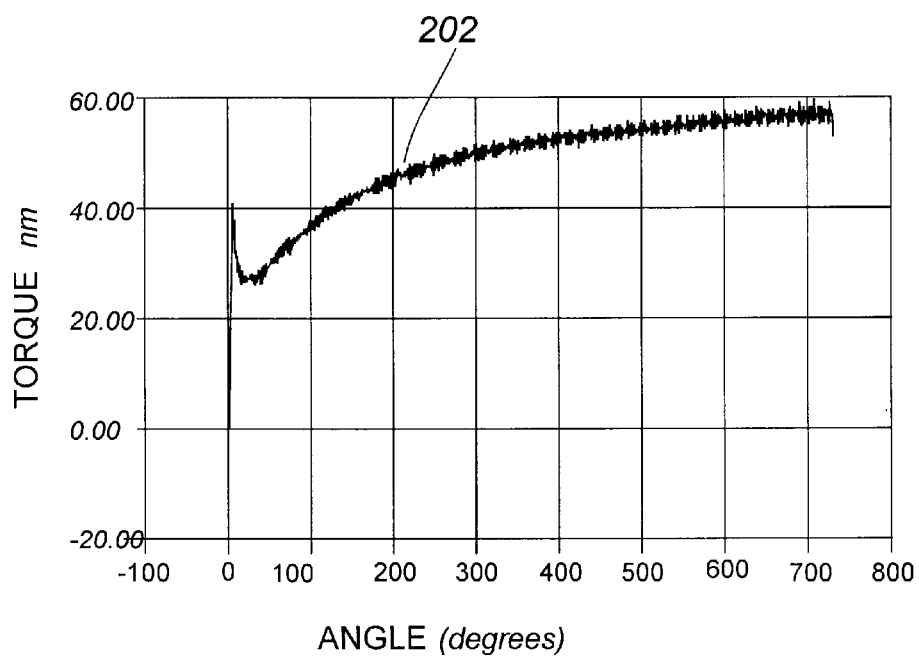
FIG. 2b shows test data for a torsion bar that has been cold formed and then annealed

Reference is again made to the test data illustrated by curve 200 of FIG. 2a which shows a dramatically reduced transition zone between elastic and plastic behavior of the torsion bar 50 and which has been achieved without the need to anneal the material subsequent to forming the torsion bar 50. Were the torsion bar 50 annealed the torque deflection curve would resemble the data shown in curve 202 of FIG. 2b. As such, were this extruded, cold-formed torsion bar installed within the retractor, less protraction (less occupant movement) would be needed to raise the reaction torque and internal stress to its plastic region and the reaction torque generated as the webbing is controllably protracted would be higher than that of a torsion bar that had not been pre-stressed by the extrusion process for a given amount of twist.

Reference is made to FIG. 5 which generally shows the construction of the major components of a torsion bar, energy absorbing seat belt retractor 20. The retractor 20 comprises a frame 22 with first and second sides 24a, and 24b and a back 24c, each of the first and second sides includes a respective first opening 28a or 28b. The retractor 20 also includes a hollow spool 30 rotationally supported upon the frame 22. The spool 30 includes a center body 32 and opposing flanges 34a and 34b at respective ends of the center body 32. The center body 32 includes a hollow bore 40 having splines 42 formed at one end thereof. The body 32 also includes means such as a slot (not shown) of known construction for receiving and securing an end of a length of seat belt (seat belt webbing) 36. Numeral 36a designates a few layers of the seat belt 36 wound about the spool.

A torsion bar 50 is received within the bore 40. The torsion bar includes a center body 52 and the end formations 52a and 52b. As mentioned, end formation 52b includes splines 56 (which drivingly engage with splines 42 of the spool). The notch or groove 58 (also see FIG. 4b) receives a driving key 60 of a spring arbor 62. The spring arbor 62 includes a slot 64 in which is received an inner end of a rewind spring 66. The outer end of the spring 66 is fixedly secured to a spring cover 68. The cover 68 is secured to frame side 24b and includes a circular projection 70 received within frame opening 28b. The projection 70 serves as a bushing to rotationally support the spring arbor 62, torsion bar 50 and spool 30. The spool 30 includes opposing pockets 38 located adjacent the splines 42 of the spool 30. With the torsion bar in place, a tool is inserted into the pockets to locally deform the spool 30 to crimp the spool splines 42 and the torsion bar splines 56b together.

Emergency locking retractors (ELRs) include a variety of ratchet or lock wheel assemblies. The precise type for use in the present invention is not particularly important. As is known in the art, the ratchet wheel assemblies include a sensor means for causing a locking pawl to be brought into engagement with teeth on the ratchet or lock wheel to halt the protraction of the seat belt. Such means typically include the use of a vehicle or inertia sensor to sense vehicle deceleration above a predetermined level and a web sensor which is activated to initiate the locking of the retractor when the seat belt (webbing) is withdrawn from the spool at a rate in excess of a determinable level. The ratchet or lock wheel assemblies may use one or more plastic sensor pawls which engage a plastic or metal ratchet wheel which in turn couples a lock cup to the retractor shaft (in the present case to the torsion bar). Having coupled the lock cup to the shaft (torsion bar) the lock cup rotates. The motion of the lock cup moves a load absorbing, typically metal, locking pawl into engagement with a load absorbing metal lock wheel, thus halting, if only temporarily (when using energy absorbing components such as a torsion bar), the protraction of the seat belt. One such lock wheel assembly that is usable with the present invention is disclosed in U.S. Pat. No. 5,529,258 or EP 0228729 which are incorporated herein by reference.

The end formation 52a of the torsion bar 50 is secured to a ratchet wheel assembly 80. The assembly 80 includes a ratchet body 82 and lock or ratchet wheel 84 having teeth 85.

The ratchet body includes a tubular portion 86 having internal splines 88 which engage the splines 56a of the torsion bar 50. The lock wheel 88 may be a part of the body 82 or a separate part that is staked thereto as illustrated. The ratchet body is received within frame opening 28a and is supported by a bushing 90. A locking pawl 92 is rotationally supported upon the frame side 24a and is movable into engagement with the teeth 85 of the lock wheel 84 in response to the activation of a vehicle or web sensor.

The lock wheel assembly 80 includes a web sensor 220 that is coupled to sense the angular acceleration of rotation of the spool 30. As illustrated, the web sensor is coupled to the torsion bar 50 via the lock wheel assembly 80, the speed of which (prior to lockup) is that of the spool. The lock wheel assembly further includes a vehicle sensor 222. As mentioned above, the specific implementation of the web and vehicle sensors will vary, however, this is known in the art. Whenever either the vehicle or the web sensor is activated the lock pawl 92 is brought, via known mechanisms, into locking engagement with a lock wheel 84.

The operation of the retractor 20 is generally the same of that outlined above. During an accident, the end 52a of the torsion bar 50 is locked from further rotation and the seat belt is loaded as the occupant moves or attempts to move forward. The occupant load is transferred to the spool 30, via the belt 36, whose motion is opposed by the reaction torque generated as the spring end 52b of the torsion bar is rotated. Increased occupant load will cause the spool 30 and the torsion bar to rotate, in opposition to the reaction force, thereby protracting the seat belt 36 and permitting the occupant to move forward in a controlled manner.

Many changes and modifications in the abovedescribed embodiment of the invention can, of course, be carried out without departing from the scope thereof. Accordingly, that scope is intended to be limited only by the scope of the appended claims.

I claim:

1. An energy absorbing seat belt retractor (20) comprising:
    a spool (30) and a torsion bar (50), the torsion bar including first and second end formations (52b and 52a), the first one of the end formations (52b) is drivingly connected to the spool;
    the torsion bar further includes a ductile, elongated body (52), located between the end formations and formed by extruding an oversized metal bar into a bar of a reduced diameter with its grain structure in the vicinity of a center of the bar (50) aligned in a longitudinal direction.

2. The device as defined in claim 1 wherein the end formations (52a and 52) are formed by a cold heading process.

3. The device as defined in claim 2 wherein the second end formation is connected to a lock wheel assembly means (84) for locking during an accident to prohibit the second end of the torsion bar from rotating while permitting the first end and the spool to rotate while permitting a seat belt (36) wound about the spool to be controllably protracted.

4. The retractor as defined in claim 1 wherein the torsion bar has a circular cross section.

5. An energy absorbing seat belt retractor (20) comprising:
    a frame (22);
    torsion bar means (50) comprising an extruded, reduced diameter center portion (52) rotationally supported relative to the frame for generating a predetermined reaction torque as it is twisted, the torsion bar means characterized by an elastic deformation zone and a sharp onset into a plastic deformation zone;
    a spool (30) operatively connected to rotate with the torsion bar means;
    lock means (80), adaptable during a vehicle accident and operatively connected to a first portion of the torsion bar means for, at least, temporarily stopping the torsion bar means and the spool from rotating;
    the spool having a seat belt positioned thereon, wherein with the lock means activated to prevent the first portion of the torsion bar means from rotating and with a load applied to the seat belt, the spool and the torsion bar means are rotatable in a direction of seat belt protraction opposed by the reaction force generated by the torsion bar means as it twists.

6. The device as defined in claim 5 wherein the torsion bar means is subjected to a pre-stress, prior to installation within the retractor sufficient to align the grain structure of the bar longitudinally.

7. The device as defined in claim 5 wherein the torsion bar means is subjected to a pre-stres, prior to installation within the retractor sufficient to product a sharp onset into a plastic deformation zone.

8. A method of forming a torsion bar (50) comprising the steps of:
    a) reducing the diameter of a predetermined length of oversized bar or wire stock to a desired diameter using an extrusion process,
    b) forming on one end of the reduced diameter bar a first driving formation,
    c) forming on the other end of the reduced diameter bar a second driving formation.

* * * * *